United States Patent
Kim et al.

(10) Patent No.: US 9,118,947 B2
(45) Date of Patent: Aug. 25, 2015

(54) MULTI-VISION VIRTUALIZATION SYSTEM AND METHOD

(71) Applicant: Electronics and Telecommunications Research Institute, Daejeon (KR)

(72) Inventors: Kwang-Yong Kim, Daejeon (KR); Chang-Woo Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 74 days.

(21) Appl. No.: 14/031,514

(22) Filed: Sep. 19, 2013

(65) Prior Publication Data

US 2014/0115639 A1    Apr. 24, 2014

(30) Foreign Application Priority Data

Oct. 19, 2012   (KR) .................. 10-2012-0116923
May 15, 2013   (KR) .................. 10-2013-0055283

(51) Int. Cl.
*H04N 7/18*         (2006.01)
*H04N 21/2668*      (2011.01)
(Continued)

(52) U.S. Cl.
CPC ............ *H04N 21/2668* (2013.01); *G11B 27/00* (2013.01); *H04N 21/278* (2013.01); *H04N 21/4788* (2013.01)

(58) Field of Classification Search
CPC .................. H04N 21/43615; H04N 7/106
USPC ........................................................ 725/82
See application file for complete search history.

(56) References Cited

U.S. PATENT DOCUMENTS

2011/0162031 A1   6/2011   Weon et al.
2012/0147889 A1   6/2012   Lee et al.

FOREIGN PATENT DOCUMENTS

KR   10-2008-0073495 A   8/2008
KR   10-2009-0124006 A   12/2009
(Continued)

OTHER PUBLICATIONS

NPL "The Design of Server Virtualization Based Video-wall Control System", Computing and Convergence Technology (ICCCT), 2010 7th international Conference, Dec. 3-5, 2012, pp. 401-404, Kwang-Young Kim et al.*

(Continued)

*Primary Examiner* — Jefferey Harold
*Assistant Examiner* — Omer Khalid (57) ABSTRACT

A multi-vision virtualization system includes a multi-vision virtualization server and two or more scene clients. The multi-vision virtualization server includes a multi-vision virtualization server configured to generate virtual machines for decoding processes based on image content segments, generate synchronous reproduction information for synchronization between two or more scene clients, transmit the generated synchronous reproduction information to a first scene client among the two or more scene clients, and decode the image content segments to generate decoded image segments; and the two or more scene clients including the first scene client that parses the received synchronous reproduction information, and shares the parsed synchronous reproduction information with remaining scene clients, and being configured to reproduce the decoded image segments on screens based on the parsed synchronous reproduction information.

12 Claims, 3 Drawing Sheets

(51) Int. Cl.
  *G11B 27/00* (2006.01)
  *H04N 21/278* (2011.01)
  *H04N 21/4788* (2011.01)

(56) References Cited

FOREIGN PATENT DOCUMENTS

| KR | 10-2011-0074074 A | 6/2011 |
| KR | 10-2012-0065131 A | 6/2012 |

OTHER PUBLICATIONS

Kwang-Yong Kim et al., "The Design of Server Virtualization Based Video-wall Control System", Computing and Convergence Technology (ICCCT), 2012 7th International Conference, Dec. 3-5, 2012, pp. 401-404.

Kwang-Yong Kim et al., "Virtualization-Based Multi-Vision Control System Design", Proceeding of 2012 Korea Signal Processing Conference, Sep. 22, 2012, pp. 285-288.

* cited by examiner

MULTI-VISION VIRTUALIZATION SYSTEM AND METHOD

CROSS-REFERENCE TO RELATED APPLICATION(S)

This application claims priority from and the benefit under 35 U.S.C. §119(a) of Korean Patent Applications No. 10-2012-0116923, filed on Oct. 19, 2012, and 10-2013-0055283, filed on May 15, 2013, which are hereby incorporated by references for all purposes as if fully set forth herein.

BACKGROUND

1. Field

The following description relates to a multi-vision system and a method for providing a multi-vision service, and more particularly, to a multi-vision system and a method for providing a multi-vision service using virtualization.

2. Description of the Related Art

A multi-vision system describes a method of using multiple screens to create one image, or creating different images on multiple screens. The multi-vision system is widely used in advertisements, exhibitions, and promotions, which utilize the increasingly popular digital signage screens, and may also be used in association with various screen terminals, for such services involving, security surveillance screens in connection with closed circuit TVs (CCTVs) and N-screen services.

Presently, there are three general methods for implementing multi-vision. The first method is a central control method. In this method, a number of image displaying devices arranged in an array of m*n are connected to a single multi-vision control device. The central control method does not provide a controller to each of the image displaying devices. Thus, the size of the multi-vision control device should be increased with an increase in the size of the system. Accordingly, if installed in a small space, the multi-vision device cannot ensure efficient space utilization, its manufacturing cost increases, and advanced technical skills are required for operation. In addition, for example, when an image of high resolution (1920*1080) is projected on a large screen with a maximum resolution of 3840*2160, the image is enlarged to fit the screen. In this case, processing, such as, interpolation should be performed on the image, which may cause degradation of the quality and definition of the image.

The second method is an independent control method. Unlike the central control method, the independent control method allows individual image displaying device modules of a multi-vision system to independently extract assigned image segments from an input signal, and display the extracted image segments on their screens, which are composed into one single image. Korean Patent Publication No. 10-2009-0124006 discloses one example of an independent control multi-vision system.

According to the independent control method, two or more image displaying devices are arranged in a grid of m*n, and a multi-vision control device captures a predetermined image area by enlarging or reducing an image, and directly outputs the captured image area to the image displaying device through an embedded distributor. The independent control multi-vision system has a smaller multi-vision control device compared to the size of the multi-vision control device of the central control multi-vision system, and thus can be installed in a small space more easily than the central control multi-vision system. However, when an image is displayed on a display screen with a super high resolution, the independent control method also needs to enlarge the image to fit the screen, and thus, even when performing a process, such as interpolation, on the image, this method still has the same problems as the central control method regarding the degradation of the quality and definition of an image. Moreover, with the independent control method, a total valid screen size of the multi-vision system may be limited to about ten times the size of one image displaying device's screen due to the limited capabilities of an image signal generating device and a signal distributing hardware device. Further, the independent control method does not take into account image inconsistencies associated with time delays, and hence, such image inconsistencies may occur due to time delays in each terminal, and time delays in network communications between an image signal providing unit and a set-top box.

The third method is an image dividing/distributing method. The image dividing/distributing method combines the central control method with the independent control method, and adds a pre-processing step. According to the image dividing/distributing method, an image signal providing unit includes an image providing unit, a memory, a control unit, a switching unit, a plurality of multiple connection slots, and a plurality of multiple image transmission modules, so as to generate image signals by splitting an input image signal. An image signal that requires a decoding process is transmitted to a switching unit via the control unit, and an image signal that does not require a decoding process is transmitted directly to the switching unit. The switching unit transmits the received image signals to the respective image transmission modules equipped with an image signal processor through the connection slots. The image signal processor of each image transmission module extracts a predetermined image area, and generates and processes an image segment using the extracted image area. However, this method requires a wire cable connection arranged in a grid of m*n. Thus, if the size of the multi-vision system increases, it may be difficult to install the system in a limited space. In addition, this method does not take into consideration time delays in a set-top box or time delays in network communications between the image signal providing unit and the set-top box, so instantaneous image inconsistencies can occur.

SUMMARY

The following description relates to a multi-vision control apparatus and method, in which a multi-vision control unit is virtualized as a server, then dynamically generates as many virtual machines as necessary, and, depending on an operation environment, allocates tasks to the virtual machines according to their functions and processing capabilities, and in which an international standard protocol used for spatial arrangement and time synchronization between media contents is used as metadata information, so that the waste of hardware resources can be reduced, the system load can be uniformly processed, and simultaneous display of images on image displaying devices of a multi-vision system can be ensured.

In one general aspect, there is provided a multi-vision virtualization server comprising: a multi-vision controller configured to divide received image content into two or more image content segments, generate two or more virtual machines by allocating resources required for decoding each of the image content segments based on processing capabilities and number of image content segments, and decode the image content segments using the respective generated virtual machines; a synchronization manager configured to generate synchronous reproduction information to synchronize two or more scene clients that display decoded image segments on their screens; and a session manager configured to establish virtual channels between each of the two or more scene clients and the multi-vision virtualization server, transmit the decoded image segments to the corresponding scene clients, and transmit the generated synchronous reproduction information to a first scene client among the two or more scene clients.

The first scene client may parse the received synchronous reproduction information and share parsed synchronous reproduction information with the remaining scene clients. The virtual channels may use a Virtual Desktop Delivery Protocol (VDDP) Audio/Video (A/V) virtual transmission protocol. The synchronous reproduction information may be generated using Synchronized Multimedia Integration Language (SMIL).

In another general aspect, there is provided a method of virtualizing a multi-vision including a multi-vision virtualization server and two or more scene clients, the method including: generating two or more virtual machines for a decoding process based on two or more image content segments and processing capabilities; generating synchronous reproduction information for synchronization between the two or more scene clients, and transmitting the generated synchronous reproduction information to a first scene client among the two or more scene clients; parsing, at the first scene client, the received synchronous reproduction information, and sharing parsed synchronous reproduction information with remaining scene clients; decoding, at the two or more virtual machines, the two or more image content segments to generate decoded image segments; and reproducing the two or more image content segments on the screens of the two or more scene clients based on the parsed synchronous reproduction information.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Generally, there are three multi-vision control methods: a central control method, an independent control method, and an image dividing/distributing method, all of which have the following drawbacks. First, set-top boxes connected to a plurality of image displaying devices are used. Second, image signals associated with individual displaying areas are extracted, and displayed, regardless of the capabilities of a multi-vision control unit and each set-top box. The capabilities of the multi-vision control unit refer to hardware capabilities, such as, CPU processing performance and memory. Third, due to time delays in network communications between a central server, including the multi-vision control unit and the plurality of set-top boxes connected to each image displaying device, instantaneous image inconsistencies may occur. Accordingly, the efficiency of the multi-vision system is reduced due to the waste of hardware resources, system load imbalance, and failure in time synchronization. Therefore, to overcome the aforementioned drawbacks of the existing multi-vision control methods, the present invention provides a multi-vision control system and a method, in which a multi-vision control unit is virtualized as a server, then dynamically generates as many virtual machines as necessary, and, depending on an operation environment, allocates tasks to the virtual machines according to their functions and processing capabilities, and in which Synchronized Multimedia Integration Language (SMIL), which is an international standard protocol used for spatial arrangement and time synchronization between media contents, is used as metadata information, so that the waste of hardware resources can be reduced, the system load can be uniformly processed, and simultaneous display of images on image displaying devices of a multi-vision system can be ensured.

Figure 1:
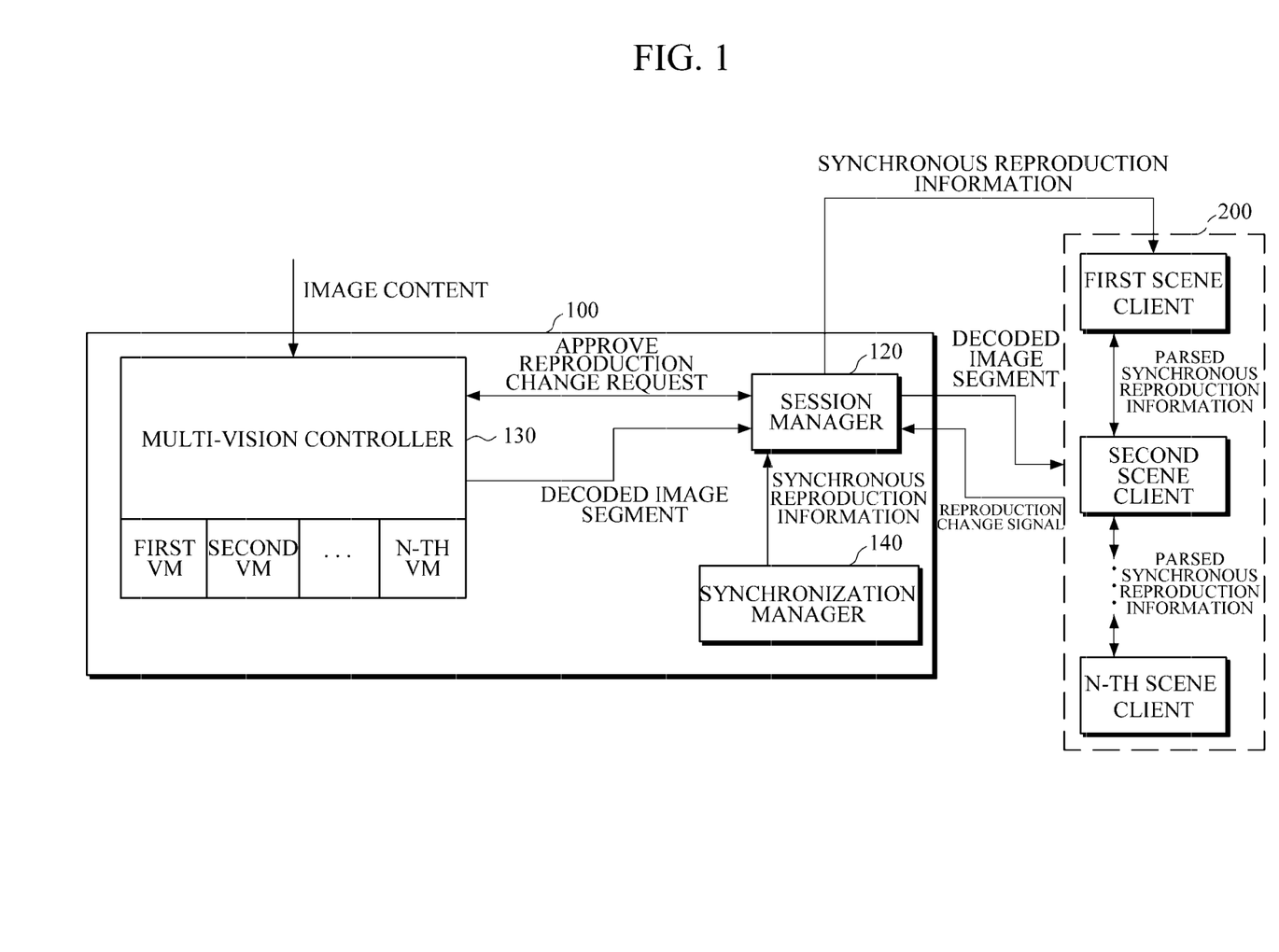
FIG. 1 is a diagram illustrating a multi-vision virtualization system according to an exemplary embodiment of the present invention.

FIG. 1 is a diagram illustrating a multi-vision virtualization system according to an exemplary embodiment of the present invention.

Referring to FIG. 1, the multi-vision virtualization system includes a multi-vision virtualization server 100 and a plurality of scene clients 200.

The multi-vision virtualization server 100 includes a session manager 120, a multi-vision controller 130, and a synchronization manager 140.

The session manager 120 controls and manages a session connection between the multi-vision virtualization server 100 and two or more scene clients 200. The session manager 120 establishes two or more virtual channels to connect the multi-vision virtualization server 100 and the two or more scene clients 200. A communication interface of the virtual channels to connect the multi-vision virtualization server 100 and the scene clients 200 may be generally a Transmission Control Protocol/Internet Protocol (TCP/IP) communication interface.

The multi-vision virtualization server 100 transmits two or more decoded image segments to the respective scene clients 200 through the virtualization channels established by the session manager 120. The decoded image segments may be transmitted using a virtual desktop delivery protocol (VDDP) audio/video (A/V) virtual transmission protocol VDDP (Virtual Desktop Delivery Protocol). The VDDP A/V virtual transmission protocol may be an A/V reproduction protocol based on the Microsoft Remote Desktop Protocol (RDP), which provides a remote desktop control. The two or more decoded image segments are generated by decoding the image segments that are divided by the multi-vision controller 130. The session manager 120 transmits the two or more decoded image segments to the respective corresponding scene clients 200. To this end, the session manager 120 manages the multi-session to ensure a seamless A/V reproduction session.

The session manager 120 is implemented in the form of a virtual machine within the multi-vision virtualization server 100. The session manager 120 controls and manages a connection server within the multi-vision virtualization server 100, and connects the multi-vision controller 130 and the synchronization manager 140, which are included in the multi-vision virtualization server 100.

The multi-vision controller 130 allocates resources of the multi-vision virtualization server 100 to generate two or more virtual machines that perform decoding operations. The multi-vision controller 130 divides received image contents into two or more parts that are dealt with by the respective two or more scene clients 200 according to the processing capabilities of the scene clients 200. The processing capabilities include video resolution rendering and A/V decoding. The multi-vision controller 130 divides a single image content into two or more image content segments that the respective two or more scene clients reproduce. In addition, the multi-vision controller 130 estimates an output location and size ratio of each image segment to be displayed on an image reproducing device of each scene client 200. Further, the multi-vision controller 130 allocates resources based on the processing capabilities and the estimated information to generate the two or more virtual machines to decode the image content segments.

Specifically, the multi-vision controller 130 divides an image into a number of image segments to be reproduced on the screens of the two or more scene clients 200, in consideration of the number of scene clients 200 and the display method of the image segments. Moreover, the multi-vision controller 130 allocates hardware resources to generate the virtual machines, such that the virtual machines can perform a decoding operation taking into consideration a resolution, a type, and an encoding method of each image segment. During these processes, the multi-vision controller 130 decodes a compressed video into original image frames in units of pixels, and also calculates the output location and size ratio of each image segment to be displayed on each scene client 200.

Each virtual machine generated by the multi-vision controller 130 receives a corresponding image segment among the two or more image segments, which are divided from the image content based on the number of scene clients 200 and the display method, and generates a decoded image segment by decoding the received image segment. Then, the multi-vision controller 130, which generates the virtual machine for the decoding, approves a reproduction change to the session manager 120.

The synchronization manager 140 generates reproduction synchronization information, prior to transmitting the image segments decoded by the multi-vision controller 130 to the scene clients 200 through the session manager 120, so that the scene clients 200 can reproduce the image segments which are synchronized with each other. The synchronization manager 140 generates the synchronous reproduction information by updating information regarding time synchronization, spatial synchronization, and event processing synchronization. Text format of synchronized multimedia integration language (SMIL), which is an international standard, may be used as a protocol standard of the synchronous reproduction information to enable the time/spatial synchronization between multimedia content, such as, video, audio and text, which are reproduced by the scene clients 200. Thus, the synchronization manager 140 is able to use the synchronous reproduction information as a transmission/reception synchronization protocol of the multi-vision virtualization server 100 and the scene clients 200. The SMIL is a new web markup language that is a World Wide Web consortium (3WC) recommended Extensible Markup Language (XML) for defining markup of multimedia on the Internet.

The synchronization manager 140 transmits the synchronous reproduction information to a first scene client 201, among the two or more scene clients 200, and the first scene client 201 parses the received synchronous reproduction information, and shares the parsed synchronous reproduction information with other neighboring scene clients 200.

The two or more scene clients 200 include image reproducing devices capable of displaying various images including received multi-vision data, the multi-vision virtualization server 100, and the communication interface for communications.

In response to receiving the synchronous reproduction information from the multi-vision virtualization server 100 through the session manager 120, the first scene client 201, out of the two or more scene clients 200, parses the received synchronous reproduction information. If the received synchronous reproduction information is generated in SMIL, the first client 201 parses the SMIL of the synchronous reproduction information. Then, the first client 201 shares the parsed information with the remaining scene clients. Based on the shared synchronous reproduction information, the two or more scene clients 200 synchronize the decoded image segments that are more than two pieces of image segment information, and reproduce the synchronized image segments. Because the synchronization between the two or more scene clients 200 is continuously carried out based on the synchronous reproduction information received from the multi-vision virtualization server 200, image inconsistencies due to time delays during the network communications between each scene client 200 and the multi-vision virtualization server 200 can be prevented.

The two or more scene clients 200 receive decoded image segments from corresponding synchronization managers 140 in the multi-vision virtualization server 100. The decoded image segments are image information of segments divided from the same image, and they have already been decoded by the synchronization manager 140, and then transmitted to the scene clients 200. Therefore, the scene clients 200 do not require additional decoding operations on the received image data to display the received image segments on their screen. Generally, a large amount of hardware resource is required for decoding process in the course of image data processing. However, according to the above exemplary embodiment, the scene clients 200 can skip the decoding process on the received image data, and thus there is no need for high-performance hardware resources. Hence, the scene clients 200 are capable of displaying various images on their screens without being restricted by resolutions, quality, and types of images, and they can be designed to be compact and light. In addition, regardless of the performance disparity between the two or more scene clients 200, time delays or image inconsistencies y that may occur due to system load during reproduction of the decoded image segments can be avoided.

Moreover, each scene client 200 may include a variety of input interfaces, such as a touch screen, a mouse, and a keyboard. When a reproduction change occurs through the input interface, the scene client 200 transmits a reproduction change signal to the multi-vision virtualization server 100 via TCP/IP through the virtualization channel. In response to receiving the reproduction change signal from the scene client through the session manager 120, the multi-vision virtualization server 100 issues a request for reproduction change to the multi-vision controller 130. Then, the multi-vision controller 130 approves the reproduction change, and allocates resources to the virtual machine, based on the request for reproduction change, so as to perform a decoding process.

Figure 2:
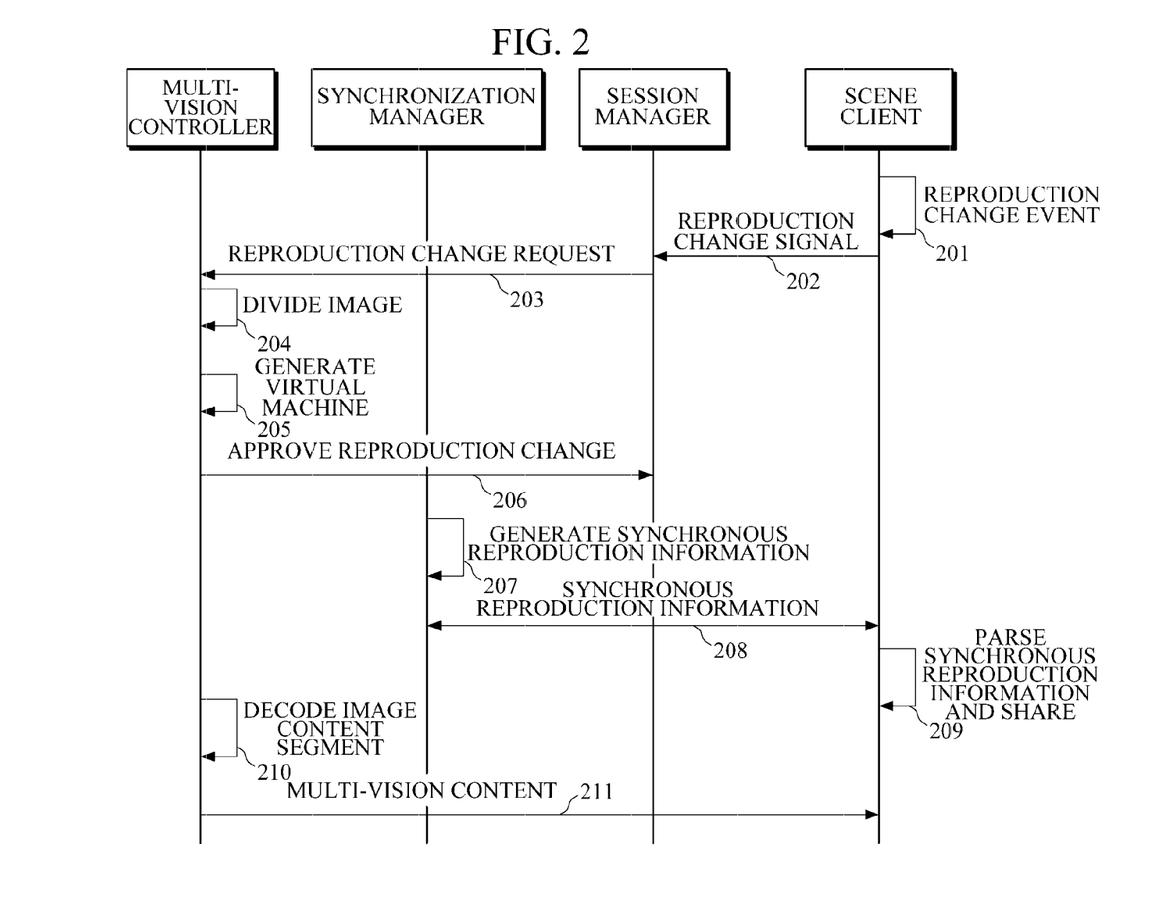
FIG. 2 is a flowchart illustrating a data flow in a multi-vision virtualization system according to an exemplary embodiment of the present invention.

FIG. 2 illustrates a flowchart of a data flow in a multi-vision virtualization system according to an exemplary embodiment of the present invention.

Referring to FIG. 2, in 201, an event relating to reproduction change occurs in a scene client. The scene client, which constitutes a multi-vision screen, receives details of a reproduction change from a user through an input device installed in the scene client with respect to an image currently displayed on a screen of the scene client. The input device of the scene client includes a keyboard, a mouse, a touch screen interface, and any input interfaces that are applicable to a general computer terminal. The user inputs an instruction for reproduction change through the input device, or input interface, installed in the scene client, with respect to the image being currently displayed on the multi-vision screen. The reproduction change instruction input by the user may include screen change, size change of a displayed image, change of image location, and the like. In response to receiving the reproduction change instruction from the user, in 202, the scene client transmits the reproduction change signal to a session manager of a multi-vision virtualization server through a virtual channel connected to the session manager. A communication interface of the virtual channel connecting the multi-vision virtualization server and the scene client may, generally, be a TCP/IP communication interface. The scene client generates the reproduction change signal corresponding to the occurring event, and transmits the reproduction change signal via TCP/IP through the virtual channel through Hardware Abstraction Layer (HAL).

In 203, the session manager that receives the reproduction change signal from the scene client issues a request for reproduction change to a multi-vision controller. In response to the request for reproduction change in 204, the multi-vision controller divides a received image content into image segments, and calculates resources required for decoding virtual machines to cooperate with each other for decoding. The multi-vision controller divides the image content into areas to be processed by the respective scene clients, according to processing capabilities of the scene clients, and estimates output location and size ratio information regarding the image segment to be displayed on an image reproduction device of each scene client. First, in 204, the multi-vision controller divides the received image content into areas to be processed by the respective two or more scene clients, according to processing capabilities. The processing capabilities include video resolution rendering, A/V decoding, and the like. The multi-vision controller divides the single image content into two or more image content segments to be reproduced by the respective scene clients.

Then, in 205, the multi-vision controller generates virtual machines to decode the image segments, based on the image segments and processing capabilities of the scene clients. For example, the multi-vision controller calculates the number of virtual machines and the amount of resources required for decoding operation based on the estimation result and the image content segment. In addition, the multi-vision controller decodes a compressed video into original image frames in units of pixels, and calculates both the output location and size ratio of each image segment for the individual scene clients. Further, the multi-vision controller generates the virtual machines by taking into consideration the calculated amount of resources. In 206, the multi-vision controller that has generated the two or more virtual machines for decoding operation issues approval for the reproduction change to a session manager in response to a request for reproduction change Then, in 207, the synchronization manager generates synchronous reproduction information. When the multi-vision controller permits the reproduction change, the synchronization manager generates synchronous reproduction information before streaming the decoded content, such that the scene clients are synchronized with each other before the image is reproduced. The synchronous reproduction information may be generated by updating information regarding time synchronization, spatial synchronization, and event processing synchronization. Text format of synchronized multimedia integration language (SMIL), which is an international standard, may be used as a protocol standard of the synchronous reproduction information to enable the time/spatial synchronization between multimedia content, such as, video, audio, and text, which are reproduced by the scene clients.

In 208, the synchronization manager transmits the generated synchronous reproduction information to the scene clients through the session manager. The synchronization manager transmits the synchronous reproduction information to a first scene client, among the two or more scene clients. In 209, the first scene client parses and shares the received synchronous reproduction information. More specifically, the first scene client parses the received synchronous reproduction information. Then, the first scene client shares the parsed synchronization production information with other neighboring clients. Two or more scene clients sharing the parsed synchronization production information synchronize the decoded image segments based on the shared information, and reproduce the synchronized image segments.

Once the synchronous reproduction information is shared between the two or more scene clients, in 210, the multi-vision controller decodes the image content segments through two or more virtual machines. The two or more virtual machines, receive one or more image content segments, which are generated by taking into consideration the number of scene clients and a display method. The virtual machines receive the corresponding image content segments, and decode the received image content segments to generate decoded image segments.

Then, in 211, the multi-vision controller transmits the decoded image segments to the scene clients. The decoded image segments are transmitted to the corresponding scene clients 211. To transmit the decoded image segments, VDDP A/V virtual transmission protocol may be used. The VDDP A/V virtual transmission protocol may be an A/V reproduction protocol based on the Microsoft Remote Desktop Protocol (RDP), which provides a remote desktop control. The multi-vision controller streams the image segments, which have been decoded using the VDDP A/V virtual transmission protocol, to the scene clients through the virtual channel connected via the session manager.

Figure 3:
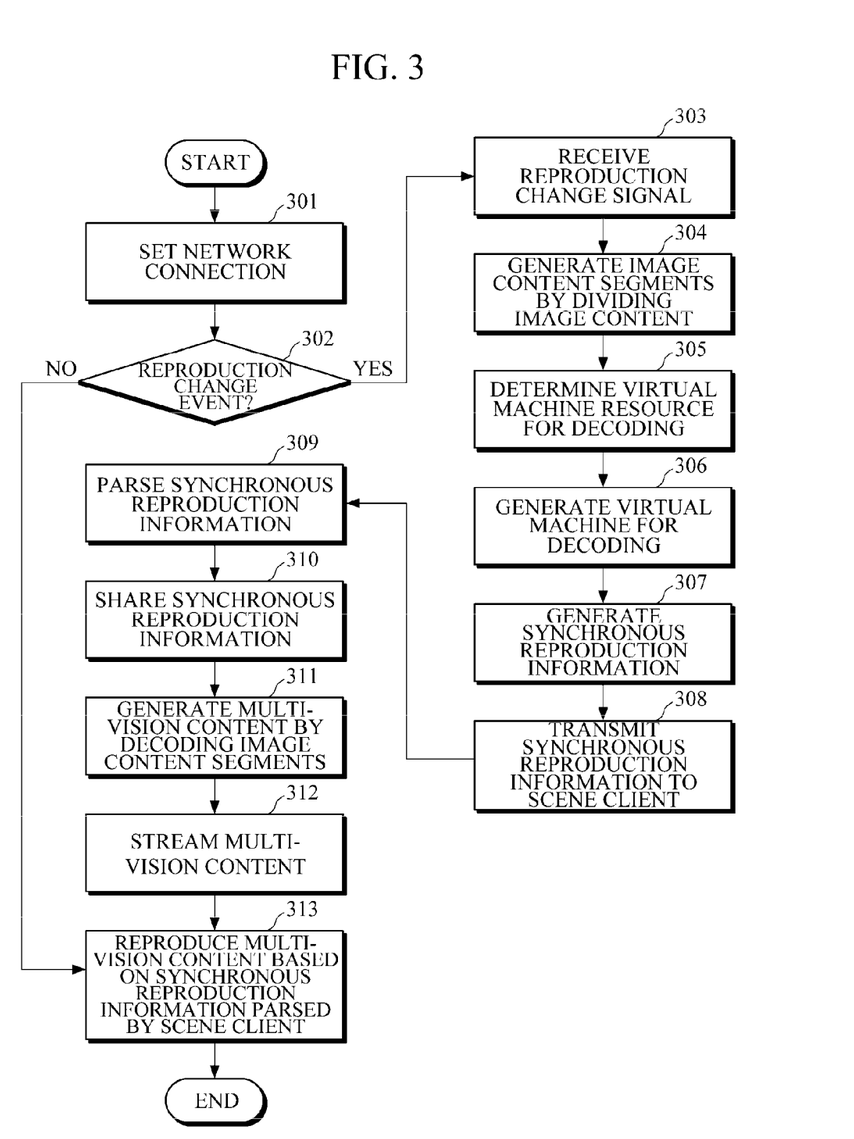
FIG. 3 is a flowchart illustrating a method for multi-vision virtualization according to an exemplary embodiment of the present invention.

FIG. 3 illustrates a flowchart of a method for multi-vision virtualization according to an exemplary embodiment of the present invention.

Referring to FIG. 3, in 301, network connection setting is established between a multi-vision virtualization server and two or more scene clients. A session manager of the multi-vision virtualization server establishes two or more virtual channels associated with the respective two or more scene clients to connect each scene client and the multi-vision virtualization server. The virtual channels may generally use a TCP/IP communication interface as their communication interface.

Then, in 302, a determination is made as to an occurrence of a reproduction change in the scene client, specifically, by checking whether a reproduction change instruction with respect to a multi-vision image currently displayed on a screen is received from a user through an input device of the scene client. The input reproduction change instruction may include screen change, size change of displayed image, change of image location, and the like. If a reproduction change, in which a reproduction change signal is input into the scene client from the user, does not occur, in 313, the decoded image segments remains displayed on a screen of the scene client.

If the reproduction change by the user occurs in the scene client, in 303, a reproduction change signal is received from the scene client. More specifically, in response to the occurrence of the reproduction change, the scene client transmits the reproduction change signal to the multi-vision virtualization server through a virtual channel. The scene client generates the reproduction change signal corresponding to the occurring event, and transmits the generated reproduction change signal to the virtualization server via TCP/IP through a virtual channel through HAL. The multi-vision virtualization server approves the reproduction change in response to the received reproduction change signal.

Then, in 304, the multi-vision virtualization server divides the image content into two or more image segments to be, respectively, processed by the two or more scene clients, according to processing capabilities of the scene clients. The processing capabilities include video resolution rendering, A/V decoding, and the like. In 305, the multi-vision virtualization server determines resources for virtual machines to perform decoding. Specifically, the multi-vision virtualization server divides the image content into areas that are processed by the respective scene clients, according to the processing capabilities, and estimates an output location and size ratio of each image segment to be displayed on an image reproducing device of each scene client. Then, the multi-vision virtualization server sets resources for the virtual machines to decode the image segments, based on the estimation result.

Once hardware resources are set for the virtual machines to decode the image segments, in 306, two or more virtual machines for decoding are generated based on the setting. For example, the multi-vision virtualization server generates two or more virtual machines by taking into account the settings of the hardware resources required for decoding the image segments. When a multi-vision controller generates the virtual machines for the decoding process, the reproduction change requested via the reproduction change signal is approved.

In response to the reproduction change request approval, the multi-vision virtualization server generates synchronous reproduction information in 307. The synchronous reproduction information is used to synchronize the decode image segments when they are reproduced by the two or more scene clients. The synchronous reproduction information is generated by updating information regarding time synchronization, spatial synchronization, and event processing synchronization. Text format of SMIL, which is an international standard, may be used as a protocol standard of the synchronous reproduction information to enable the time/spatial synchronization between multimedia content, such as, video, audio, and text, which are reproduced by the scene clients.

In 308, the generated synchronous reproduction information is transmitted to one of the scene clients. In response to receiving the synchronous reproduction information, the scene client parses the received synchronous reproduction information. The synchronous reproduction information may be generated using text format of SMIL as a protocol standard. In this case, the synchronous reproduction information is parsed in SMIL. Then, in 309, the parsed synchronous reproduction information is shared with other scene clients. Based on the shared synchronous reproduction information, the two or more scene clients can be synchronized with each other.

Upon completing parsing and sharing the synchronous reproduction information between the scene clients, in 310, the decoded image content is decoded to generate a decoded image segment. More specifically, the virtual machines that are generated by the multi-vision controller generate two or more decoded image segments by decoding image content segments generated by dividing one piece of image content into two or more areas. The two or more decoded image segments correspond to the respective scene clients.

In 311, the multi-vision virtualization server transmits the generated decoded image segments to the corresponding scene clients. The decoded image segments may be transmitted using VDDP A/V virtual transmission protocol. VDDP A/V virtual transmission protocol may be an A/V reproduction protocol based on the Microsoft Remote Desktop Protocol (RDP), which provides a remote desktop control.

In 312, the two or more scene clients reproduce the corresponding decoded image segments based on the shared synchronous reproduction information. The two or more scene clients receive different decoded image segments. Then, the scene clients display the received decoded image segments based on the shared synchronous reproduction information. The decoded image segments are generated following completion of the decoding process in the multi-vision virtualization server, and hence, the scene clients do not require large hardware resources. Moreover, the two or more scene clients share the synchronous reproduction information therebetween, and reproduce the image segments based on the shared synchronous reproduction information. This can prevent an error between the two or more scene clients, which may occur due to network connection conditions or time delay. Further, since only small hardware resources are required, the scene client can be designed to be smaller, and thereby less affected by locations and allowing easy expansion of the multi-vision.

According to the exemplary embodiments of the present invention, the multi-vision virtualization system and method may avoid the waste of hardware resources, effectively distribute system load by allocation and cooperation process in accordance with resource processing capabilities, and ensure the simultaneous reproduction of image display devices. Therefore, the multi-vision virtualization system and method exhibit high utilization in digital signage multi-vision services, multi-vision security control services, and remote multi-video conference services. In addition, this system and method can contribute to and be utilized as international standards for dynamic time-synchronous reproduction and spatial arrangement to provide synchronization between N-screens, and simultaneous reproduction synchronization between digital signage screens.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-vision virtualization server comprising:
   a multi-vision controller configured to divide received image content into two or more image content segments, generate two or more virtual machines by allocating resources required for decoding each of the image content segments based on processing capabilities and number of image content segments, and decode the image content segments using the respective generated virtual machines;
   a synchronization manager configured to generate synchronous reproduction information to synchronize two or more scene clients that display decoded image segments on their screens; and
   a session manager configured to establish virtual channels between each of the two or more scene clients and the multi-vision virtualization server, transmit the decoded image segments to the corresponding scene clients, and transmit the generated synchronous reproduction information to a first scene client among the two or more scene clients.

2. The multi-vision virtualization server of claim 1, wherein the first scene client parses the received synchronous reproduction information and shares parsed synchronous reproduction information with the remaining scene clients.

3. The multi-vision virtualization server of claim 2, wherein the virtual channels use a Virtual Desktop Delivery Protocol (VDDP) Audio/Video (A/V) virtual transmission protocol.

4. The multi-vision virtualization server of claim 1, wherein the synchronous reproduction information is generated using Synchronized Multimedia Integration Language (SMIL).

5. The multi-vision virtualization server of claim 1, wherein one of the two or more virtual machines receives a corresponding image content segment among the two or more image content segments, and decodes the received image content segment to generate a decoded image segment.

6. A method of virtualizing a multi-vision including a multi-vision virtualization server and two or more scene clients, the method comprising:
   generating two or more virtual machines for a decoding process based on two or more image content segments and processing capabilities;
   generating synchronous reproduction information for synchronization between the two or more scene clients, and transmitting the generated synchronous reproduction information to a first scene client among the two or more scene clients;
   parsing, at the first scene client, the received synchronous reproduction information, and sharing parsed synchronous reproduction information with remaining scene clients;
   decoding, at the two or more virtual machines, the two or more image content segments to generate decoded image segments; and
   reproducing the two or more image content segments on the screens of the two or more scene clients based on the parsed synchronous reproduction information.

7. The method of claim 6, further comprising:
   generating the two or more image content segments by dividing received image content.

8. The method of claim 6, wherein the multi-vision virtualization server and each of the two or more scene clients are connected to each other through virtual channels using Virtual Desktop Delivery Protocol (VDDP) Audio/Video (A/V) virtual transmission protocol.

9. The method of claim 6, wherein the synchronous reproduction information is generated using Synchronized Multimedia Integration Language (SMIL).

10. A multi-vision virtualization system comprising:
    a multi-vision virtualization server configured to generate virtual machines for decoding processes based on image content segments, generate synchronous reproduction information for synchronization between two or more scene clients, transmit the generated synchronous reproduction information to a first scene client among the two or more scene clients, and decode the image content segments to generate decoded image segments; and
    the two or more scene clients including the first scene client that parses the received synchronous reproduction information, and shares the parsed synchronous reproduction information with remaining scene clients, and being configured to reproduce the decoded image segments on screens based on the parsed synchronous reproduction information.

11. The method of claim 10, wherein the multi-vision virtualization server and each of the two or more scene clients are connected to each other through virtual channels using Virtual Desktop Delivery Protocol (VDDP) Audio/Video (A/V) virtual transmission protocol.

12. The method of claim 10, wherein the synchronous reproduction information is generated using Synchronized Multimedia Integration Language (SMIL).

* * * * *